CLOTH STRAIGHTENING APPARATUS
Original Filed May 9, 1966 2 Sheets-Sheet 1
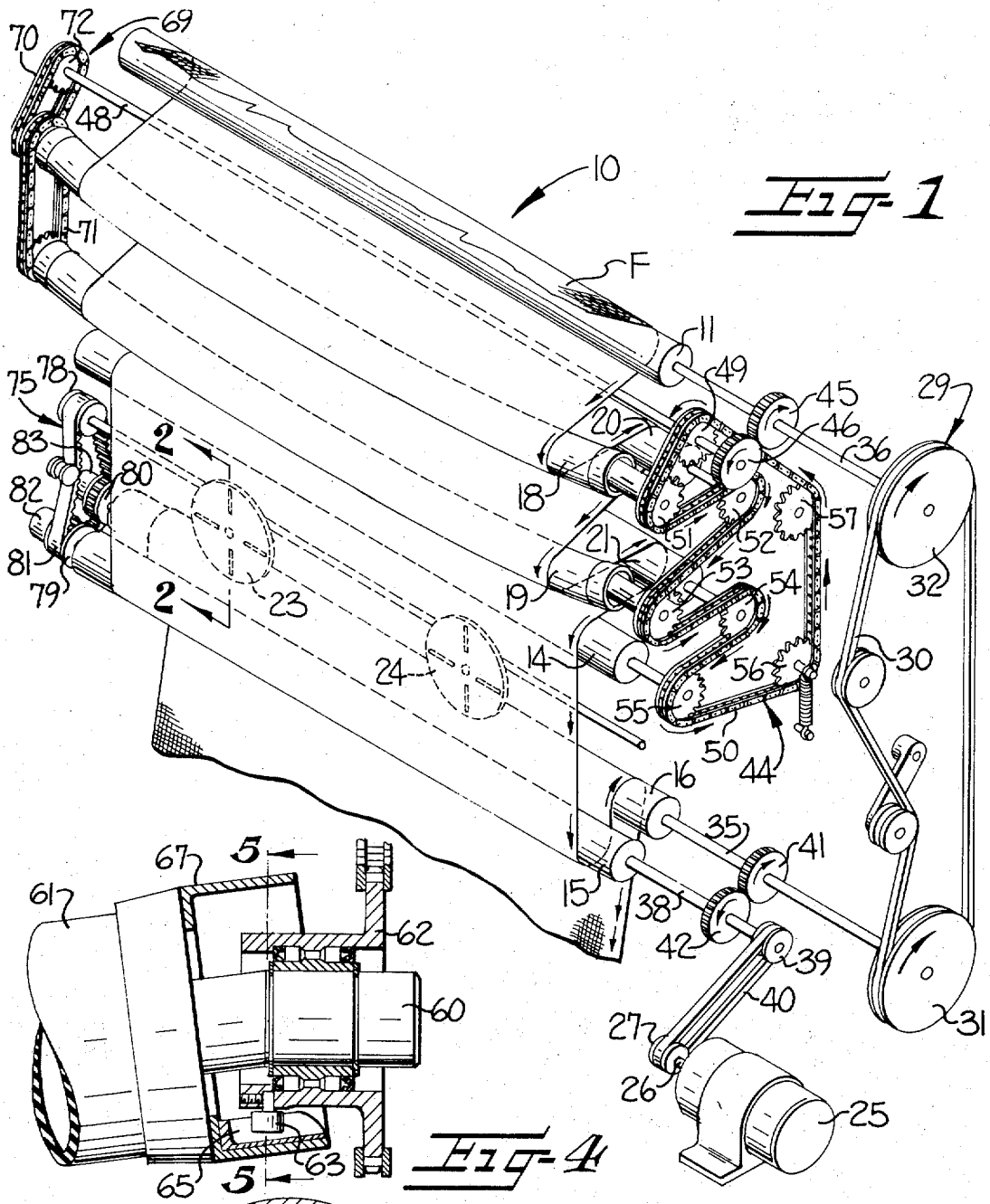
Fig-1
Fig-4
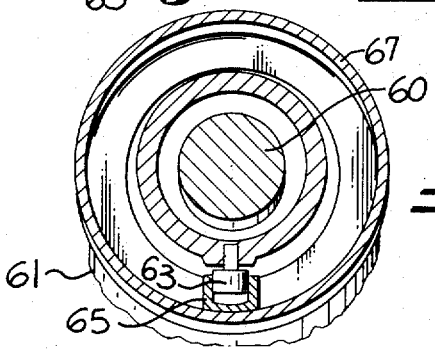
Fig-5
INVENTORS:
FRANK W. LEITNER and
WILLIAM T. GRIFFIN
BY Parrott, Bell, Seltzer, Park & Gaard
ATTORNEYS

CLOTH STRAIGHTENING APPARATUS

Original Filed May 9, 1966 2 Sheets-Sheet 2

INVENTORS:
FRANK W. LEITNER and
WILLIAM T. GRIFFIN
BY Parrott, Bell, Seltzer, Park & Gaard
ATTORNEYS United States Patent Office Re. 27,516
Reissued Oct. 31, 1972

27,516
CLOTH STRAIGHTENING APPARATUS

Frank W. Leitner and William T. Griffin, Charlotte, N.C., assignors to Coltron Industries, Inc., Matthews, N.C.

Original No. 3,402,443, dated Sept. 24, 1968, Ser. No. 548,552, May 9, 1966. Application for reissue Sept. 23, 1970, Ser. No. 74,645
Int. Cl. D06h *3/12*
U.S. Cl. 26—51.5 10 Claims

Matter enclosed in heavy brackets [ ] appears in the original patent but forms no part of this reissue specification; matter printed in italics indicates the additions made by reissue.

ABSTRACT OF THE DISCLOSURE

Apparatus for correcting fabric distortions, such as bow, skew, or combinations thereof, including correction means defining a correction zone, feeding means for positively feeding distorted fabric to the correction means for correction of the distortions therein and serving to delineate the input side of the correction zone, and advancing means for positively advancing the corrected fabric from the correction means and for delineating the output side of the correction zone, the feeding means and advancing means operating at substantially equal lineal surface speeds so that elongation or stretching of the fabric during correction is avoided.

This invention relates to a cloth straightening apparatus and, more particularly, to such an apparatus which facilitates the correction of distortions in the construction of a wide range of textile fabrics without causing problems in the further handling or processing thereof.

In the process of manufacturing and finishing textile fabrics, distortions are frequently introduced into the construction of the textile fabric. For example, in a woven fabric the filling yarns which are normally perpendicular to the warp yarns and are spaced apart in a predetermined pattern, become skewed or bowed, or combinations thereof with respect to the warp yarns.

Apparatus has been developed and heretofore used for correcting such distortions appearing in filling yarns, such as the apparatus shown and described in United States Patents Nos. 3,192,595 and 3,193,688, issued July 6, 1965. In such cloth straightening apparatus, a plurality of guide and correction rolls are supported for rotation about predetermined axes and are adapted to support a textile fabric for movement along a predetermined path. Usually, the guide rolls are supported for rotation about predetermined fixed axes, while the direction of the predetermined axes on which the correction rolls are supported for rotation may be controllably varied. A distortion sensing means and a control means are provided for detecting the presence of distortions in the construction of fabric engaged and supported by the guide and correction rolls and for controlling the position of the axes about which the correction rolls rotate so as to position those rolls to correct such distortions. Heretofore, the guide and correction rolls have been driven in rotation by the fabric and the distortion sensing means has been traversed by connections from one of the guide rolls. A more detailed discussion of the construction and operation of such a cloth straightener may be found in the above-mentioned patents.

While cloth straighteners of the type described above have proved highly advantageous in obtaining uniformly high quality production during the manufacture and finishing of textile fabrics, the use of such apparatus in manufacture and finishing of certain types of textile fabrics has heretofore presented certain difficulties. More particularly, it has heretofore been necessary to advance fabric through such a cloth straightener under a relatively high degree of tension to assure engagement of the fabric with the rolls of the cloth straightener to rotate these rolls to provide the desired corrective action and to traverse the distortion sensing means. In obtaining the relatively high degree of tension, the tension present in the fabric has varied along the path of movement of the fabric, particularly between the correction zone wherein the fabric engages the correction rolls and the detection zone wherein the presence of distortions is sensed.

With certain woven fabrics, such as woolens, cotton flannels, lawns, and gauze, this high tension results in stretching of the fabric during straightening which is injurious in a variety of ways. First, such stretching gives rise to changes in the number of picks per inch of woven fabric, causing the fabric construction to vary from the initial woven construction and to a certain extent nullifying any previous compressive shrinkage to which the fabric may have been subjected. Further, baggy selvages will frequently result from this stretching, and these or other distortions may be sensed by the sensor means and overcorrection introduced into the fabric as a result thereof.

Due to the natural resilience of a knitted fabric, as compared to a woven fabric, it has heretofore been virtually impossible to satisfactorily correct coursewise distortions in the construction of a knitted fabric through the use of a cloth straightener of conventional type.

With the foregoing in mind, it is an object of the present invention to provide a cloth straightening apparatus of the type described capable of correcting coursewise distortions in knit fabric and wherein the aforementioned difficulties which have heretofore been encountered in the correction of fillingwise distortions in woven fabric are obviated.

A more specific object of this invention is to provide a cloth straightener apparatus for correcting fillingwise and coursewise distortions in a textile fabric with minimal tension during detection and correction of distortions in the fabric and without a change in tension during detection and corrections of such distortions, so that the tension in the fabric during passage of the same through the apparatus is substantially uniform.

Some of the objects and advantages of the invention having been stated, others will appear as the description proceeds, when taken in connection with the accompanying drawings, in which—

FIGURE 1 is a schematic perspective view of one cloth straightening apparatus in accordance with this invention;

FIGURE 4 is an elevation view, in partial section, of portion of one correction roll of the apparatus of FIG-JRE 1; and FIGURE 5 is a section view, taken substantially along he line 5—5 in FIGURE 4.

Figure 3:
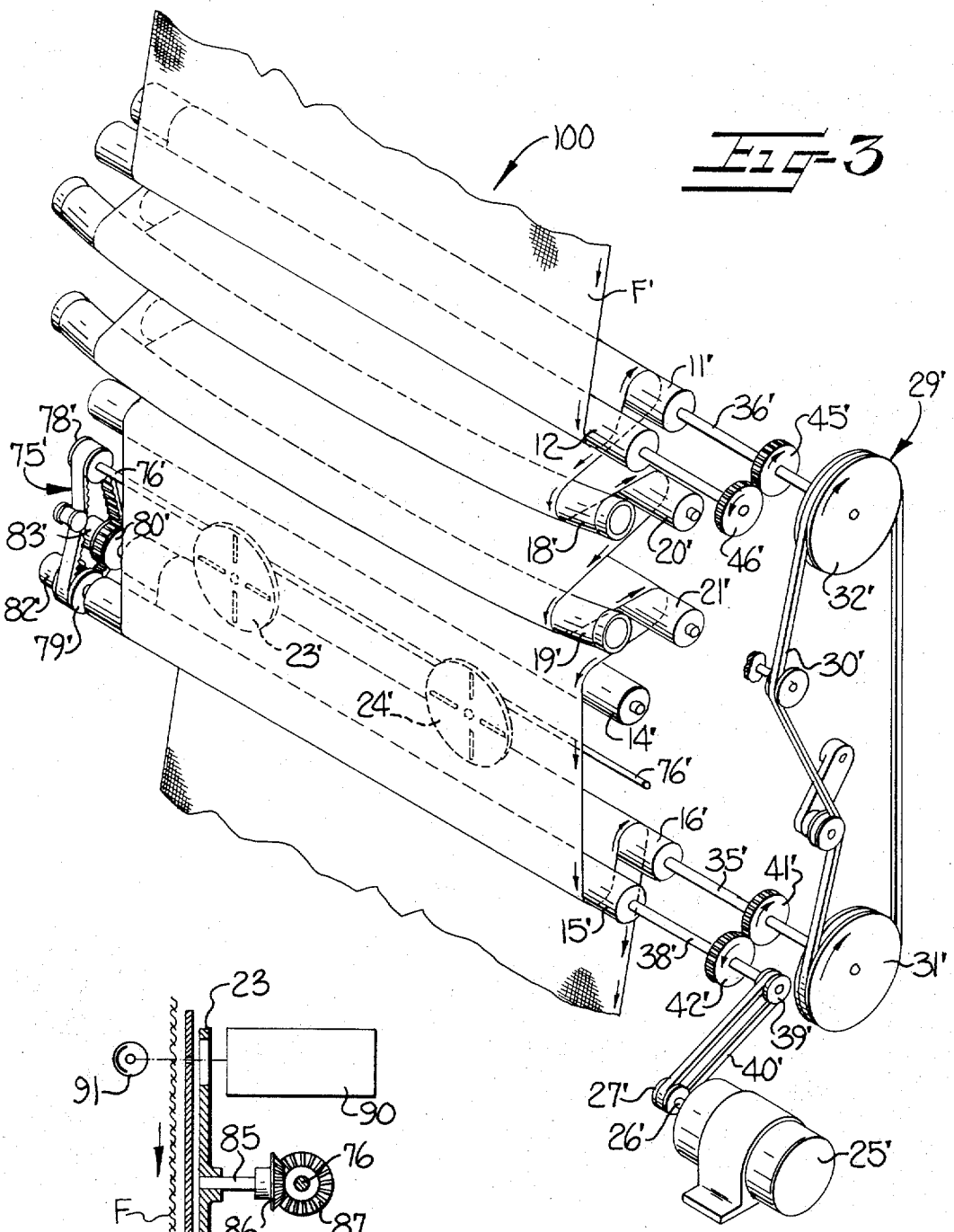
FIGURE 3 is a view similar to FIGURE 1 of another pparatus in accordance with this invention.

Referring now more particularly to the drawings, a cloth traightening apparatus in accordance with the present in-ention is there schematically shown, generally indicated t 10 (FIGURE 1), and will hereinafter be described in etail. The cloth straightening apparatus includes a plu-ality of guide rolls mounted for rotation about fixed axes nd a plurality of correction rolls supported for rotation bout controllably positioned axes, the guide rolls being dapted to engage a textile fabric and support the same or movement along a predetermined path while the cor-ection rolls correct distortions in the construction of the abric. Preferably, the guide rolls include a feeding means n the form of an entry roll 11, an intermediate roll 14, nd an advancing means in the form of a pair of co-perating exit rolls 15, 16. Fabric F entering the cloth traightening apparatus 10 passes over the entry roll 11, nd is guided thereby along a predetermined path to the ntermediate roll 14 and to the exit rolls 15, 16, from vhich the fabric passes to a suitable take-up device or a urther processing apparatus (neither of which are shown). The intermediate roll 14 defines a point of separation long the predetermined path of fabric movement between correction zone in which the fabric engages the correc-ion rolls and a scanning zone in which a sensor means cans the fabric for distortions in the construction thereof.

Within the correction zone, where correction of distor-ions in the construction of the fabric takes place, the abric engages and is supported by a correction means in he form of a plurality of correction rolls, including a air of bow rolls 18, 19 and a pair of skew rolls 20, 21. Each of the corrections rolls 18–21 is supported for rota-ion about a controllably positioned axis, in a manner uch as that described in the aforementioned United States Patents Nos. 3,192,595 and 3,193,688, in order that the orrection rolls 18–21 may be positioned to correct distor-ions in the construction of the fabric passing thereover.

Positioned adjacent the path of fabric movement and etween the intermediate roll 14 and the exit rolls 15, 16, s a sensor means (not shown in full) for detecting dis-ortions in the construction of the fabric passing through he cloth straightening apparatus 10. Certain elements of he sensor means are mounted for scanning movement djacent the fabric path, such as a pair of scanning discs 3, 24. The details of the construction and operation of he sensor means is not of direct concern to the present ubject invention, and thus will not be described in detail. One suitable means is discussed in the aforementioned United States patents. As also discussed in those patents, control means (not shown) is provided for responding o the sensor means and controlling the position of the orrection rolls 18–21, to result in correction of sensed istortions upon passage of the fabric over the correction olls 18–21.

In accordance with the present invention, and in order o permit passage of fabric through the apparatus 10 with ninimal tension therein during detection and correction f distortions in the construction of the fabric, the present nvention comprehends that the apparatus 10 include drive neans for feeding fabric to and advancing fabric from he apparatus 10 at substantially identical lineal speeds, hereby obviating fabric tension which otherwise would esult from a differential between fabric feeding and ad-ancing speeds. More particularly, the drive means com-rises a rotative motive force means and various trans-nission means connecting the motive means to moving lements of the cloth straightening apparatus 10. Prefer-ably, the rotative motive force means is an electric motor 5, having a driving shaft 26 on which a drive pulley 27 s secured.

Preferably, in order to assure passage of fabric initially having construction distortions therein through the apparatus 10 with minimal tension at all locations along the path of fabric movement, all movable elements of the apparatus 10 are driven by interconnection of those elements to the motive means electric motor 25. Such an interconnection of the elements of the apparatus 10 is illustrated schematically in FIGURE 1, to which figure reference is more particularly made. As there shown, a feeding and advancing transmission means, indicated generally at 29, includes an endless, flexible member which is supported for movement along a predetermined closed path of travel, which member preferably is in the form of a belt drive member 30. The belt 30 is supported on, and the predetermined closed path of travel thereof is partially determined by, a plurality of drive pulleys 31, 32 each of which is fixed to a respective shaft 35, 36, on which one of the guide rolls is secured, for rotation therewith. One exit roll shaft, such as the shaft 38 on which exit roll 15 is secured, has secured thereon, for rotation therewith, a suitable driven pulley 39, which is connected by means of a V belt 40 to the drive pulley 27 of the motive means electric motor 25. The exit roll shafts 35, 38 are coupled together for cooperative rotation by a meshing pair of gears 41, 42 respectively secured to the shafts. The interconnection of the shafts 35, 36, 38 is such that the entry roll 11 and the exit rolls 15, 16 are driven at substantially equal lineal surface speeds, to respectively feed fabric and advance fabric from the correction and sensing zones of the apparatus 10 at substantially identical speeds.

In order to assure the proper feeding and advancing of the fabric F occurs, the entry roll 11 and the two exit rolls 15, 16 are adapted to have the fabric F wrapped around a substantial peripheral portion thereof. This substantial wraparound permits positive control over the feeding and advancing of the fabric F without requiring that the fabric be passed through the nip of a pair of opposed and contacting rolls, which could present possibilities of injuring the fabric undergoing correction, such as crushing the fabric.

In the cloth straightening apparatus 10, a correction transmission means, generally indicated at 44, is provided for interconnecting the correction rolls 18–21 so that those rolls rotate with a substantially identical lineal surface speed, which speed is substantially the same as the speed of the entry roll 11 and the exit rolls 15, 16. This transmission means 44 further connects the intermediate roll 14, to drive that roll at substantially the same lineal surface speed as the other rolls of the cloth straightening apparatus 10. As illustrated (FIGURE 1), the correction transmission means 44 includes a pair of meshing gears 45, 46, one of which is secured to the shaft 36 of the entry roll 11 and the other of which is secured to a jack shaft 48. At one end of the jack shaft 48 (to the right in FIGURE 1), is secured a drive sprocket 49, which is one of a series of sprockets, the remainder of which will be described more fully hereinafter, which support and determine a closed path of travel for an endless, flexible drive member 50. Other sprockets engaging the drive member 50 include a first bow roll sprocket 51, a first skew roll sprocket 52, a second bow roll sprocket 53, a second skew roll sprocket 54, an intermediate roll sprocket 55, and two idler sprockets 56, 57. Each of the skew roll sprockets 52, 54 and the intermediate roll sprocket 55 are fixed directly to the associated shaft by which the respective skew intermediate rolls 20, 21 and 14 are supported for rotation. The bow roll sprockets 51, 53 are in driving engagement with the respective bow rolls 18, 19 through a coupling arrangement described more fully hereinafter with reference to FIGURES 4 and 5.

As may be readily understood, through the means of the correction transmission means 44 and the feeding and advancing transmission means 29, the motive means electric motor 25 is effective to drive all of the moving rolls of the cloth straightening apparatus 10. The various connections of the transmission means are made in such a manner that the lineal surface speed of the various rolls is substantially identical, which thus realizes an object of this invention by advancing the fabric F through the apparatus 10 with minimal variations in tension, inasmuch as each of the guide and correction rolls which determine the path of fabric travel is driven in rotation at substantially the same lineal speed as all other rolls.

While the driving connection between the respective transmission means and the entry, intermediate, exit, and skew rolls 11, 15, 16, 14, 20, 21 is relatively simple, the construction required for the bow rolls 18, 19 necessitates a particular construction to provide the required drive arrangement, which construction is illustrated in FIGURES 4 and 5. Briefly, a bow roll is constructed with a central shaft 60 which is normally mounted on the supporting frame work (not shown) and may be rotated to change the position of the arcuate axis about which an arcuate roll body 61 may rotate. The roll body 61 is supported for rotation about the stationary central shaft 60 by means of a plurality of bearings interposed therebetween and spaced along the shaft 60. In order to permit driving the roll body 61 in rotation about the shaft 60, this invention comprehends that a sprocket and sleeve member 62 be rotatably supported about a terminal portion of the shaft 60, and include a radial projection 63. The projection 63 is received within an axially extending slot 65 formed within an extension 67 at the terminal end of the roll body 61. On rotation of the sprocket and sleeve member 62, the engagement of the radial projection 63 within the slot 65 drives the extension 67 and roll body 61 in rotation, while axial movement of the radial projection 63 within the slot 65 permits accommodation of the misalignment of the axes of rotation of the sprocket and sleeve member 62 and the roll body 61. The driving engagement between the bow roll sprockets 51, 53 and the respective bow rolls 18, 19 in the cloth straightening apparatus 10 is obtained through the type of connection described immediately heretofore.

In order to assure proper rotation of the bow rolls 18, 19, a secondary bow roll transmission means, indicated generally at 69, is provided at the opposite end of the rolls from the correction transmisison means 44. The secondary bow roll transmission means 69 employs two endless, flexible members 70, 71 which connect a drive sprocket 72 secured to the opposite end of the cross-shaft 48 from the drive sprocket 49 and suitable driven sprockets engaging the ends of the bow rolls 18, 19 through a connection as described immediately heretofore.

Figure 2:
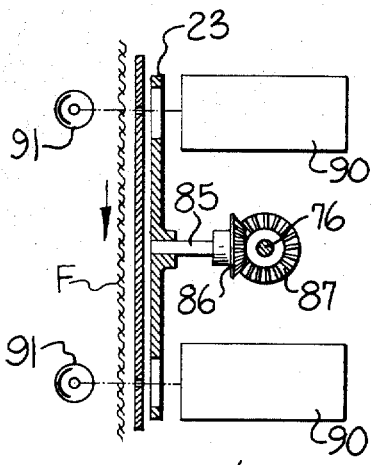
FIGURE 2 is a schematic elevation view, taken generally along the line 2—2 in FIGURE 1, of the distortion sensing means of the apparatus of this invention.

The scanning discs 23, 24 are driven in rotation by a suitable sensor transmission means 75, connecting the discs to a selected one of the pair of exit rolls 15, 16. The transmission means 75 includes a cross-shaft 76 to one end of which is secured a pulley 78. The pulley 78, in conjunction with pulleys 79 and 80, respectively connected to the shafts 38, 35 of the exit rolls 15, 16, defines a predetermined closed path of travel for an endless, flexible member 81. Each of the exit roll pulleys 79, 80 may be coupled or uncoupled to the respective exit roll shafts 38, 35 by a clutch mechanism interposed between the respective pulleys and shafts. These clutches 82, 83, respectively, are provided in order to permit an operator of the apparatus 10 to vary the direction of rotation of the scanning discs 23, 24, inasmuch as it has been found that improved operation of the apparatus 10 is obtained in certain circumstances of fabric type and speed of processing with rotation of the scanning discs 23, 24 in one or the other of the possible directions. Thus, the cross-shaft 76 may be driven clockwise or counterclockwise (in FIGURE 2) depending upon which of the clutches 82, 83 is engaged. Each of the scanning discs 23, 24 is supported by a suitable shaft, such as the shaft 85, and the shaft is connected by a right angle gearing such as the gears 86, 87, to be driven by the rotation of the cross-shaft 76.

As described in the aforementioned United States Paten No. 3,193,688, the scanning discs are positioned adjacen the path of travel of the fabric F and interposed betwee a suitable light source means 90, on one side of the fabric and a photoelectric receiver 91 on the opposite side o the fabric. For a more complete description of the con struction and operation of such an arrangement of ele ments, reference is made to the description given in con junction with FIGURE 5 of previously mentioned Unite States Patent No. 3,193,688.

In the apparatus as described immediately heretofore the movable elements of the cloth straightening apparatu 10 are driven by the drive means including the electri motor 25, in order to provide the greatest possible assur ance that the tension applied to the fabric F passing there through is at a minimum and has minimal variation throughout the length of the path through the apparatu 10. While this is the most favorable manner of operation adequate operation with certain types of fabrics has bee obtained where the driving connection to the motiv means is limited to entry and exit rolls and the scan ning discs. An apparatus 100, with the latter type of drive included therein, has been illustrated in FIGURE 3, an elements of the apparatus 100 corresponding to element of the apparatus 10 are identified by primed numerals. Inasmuch as the apparatus 100 is substantially similar to the apparatus 10, it is here considered necessary only to particularly point out the distinctions between the apparatus In particular, it may be noted that the apparatus 100 is provided with a pair of entry rolls 11', 12, rather than the single entry roll 11 of the apparatus 10. In certain instances, as where fabric F' is supplied from a location vertically above the apparatus 100, the provision of two entry rolls 11', 12 is preferred as providing a more substantial engagement of the fabric F' with those rolls which feed the fabric at a controlled lineal speed onto the correction zone of the apparatus 100. As may be noted, the transmission means 29' and 75' perform functions substantially identical to those described above for corresponding elements of the apparatus 10. The correction means transmissions 44 and 69, present in the apparatus 10, are not used in conjunction with the apparatus 100.

In the drawings and specification, there has been set forth preferred embodiments of the invention, and although specific terms are employed, they are used in a generic and descriptive sense only and not for purposes of limitation, the scope of the invention being defined in the claims.

What is claimed is:

1. Apparatus for correcting fabric distortions while avoiding elongating or stretching the fabric, said apparatus comprising:

(a) correction means defining a correction zone and adapted to engage a distorted fabric passing through the correctiion zone for correcting bow, skew, or combination type distortions therein by selectively directing widthwise portions of the fabric through a greater distance within the correction zone than the remaining widthwise portions of the fabric;

(b) feeding means disposed on an input side of said correction means for positively feeding the distorted fabric to said correction means and for delineating the input side of said correction zone, (c) advancing means disposed on the output side of said correction means and adapted to engage the corrected fabric for positively advancing the corrected fabric away from said correction means and for delineating the output side of the correction zone, said feeding means and said advancing means cooperating to confine the corrective action of said correction means on the fabric within the correction zone, and (d) drive means connected to said feeding means, said advancing means and said correction means for driving all of the same at substantially equal lineal surface speeds to feed the distorted fabric to said correction means, to pass the fabric through the correction zone, and to advance the corrected fabric from the correction zone at the same speed so that elongation or stretching of the fabric during correction is avoided since the tension in the fabric is not appreciably changed from the tension in the fabric prior to its passage to said feeding means to be fed to said correction means whereby the corrective action on the fabric can be accomplished under minimal tension and is substantially permanent.

2. Apparatus as claimed in claim 1 wherein said feed-g means and said advancing means each comprises at ast one roll adapted to have the fabric passed around substantial peripheral portion thereof, and wherein said :ive means comprises rotative motive force means and :eding and advancing transmission means connecting ıid motive force means to said feeding and advancing ›lls.

3. Apparatus as claimed in claim 1 wherein said cor-:ction means includes a pair of bow-type correction rolls, nd said drive means includes rotative motive force means nd correction transmission means connecting said cor-:ction rolls to said motive force means.

4. Apparatus as claimed in claim 3 wherein each of ıid bow-type correction rolls comprises an arcuate roll ody, a shaft supporting said roll body for rotation there-bout and having aligned straight end portions, and a leeve member rotatably mounted on one terminal end ortion of said shaft and having a radial projection engag-ıg said roll body, said sleeve member being connected o said correction transmission means to be driven there-rom and to drive said roll body by engagement of said adial projection.

5. Apparatus as claimed in claim 1 wherein said cor-ection means includes a pair of skew-type correction rolls .nd said drive means includes rotative motive force means .nd correction transmission means connecting said skew-ype correction rolls to said motive force means.

6. Apparatus as claimed in claim 1 wherein said cor-ection means comprises a pair of bow-type correction 'olls and a pair of skew-type correction rolls, and said lrive means includes rotative motive force means and cor-'ection transmission means connecting said motive force neans to said pair of bow-type correction rolls and to aid pair of skew-type correction rolls for rotating the ame at substantially equal lineal surface speeds and at ıbstantially equal lineal surface speeds with said feeding ınd advancing means.

7. Apparatus for correcting fabric distortions while ıvoiding elongating or stretching the fabric, said appa-'atus comprising:

(a) correction means defining a correction zone and adapted to engage distorted fabric passing through the correction zone for correcting bow, skew, or combination-type distortions therein by selectively directing widthwise portions of the fabric through a greater distance within the correction zone than the remaining widthwise portions of the fabric, (b) feeding means disposed on an input side of said correction means for positively feeding the distorted fabric to said correction means and for delineating the input side of said correction zone, (c) advancing means disposed on the output side of said correction means and adapted to engage the corrected fabric for positively advancing the corrected fabric away from said correction means and for delineating the output side of the correction zone, said feeding means and said advancing means cooperating to confine the corrective action of said correction means on the fabric within the correction zone, (d) delivery means disposed on the opposite side of said advancing means from said correction means and in spaced relation to said advancing means and adapted to receive the corrected fabric from the advancing means and to deliver the fabric therefrom, (e) sensor means positioned between said advancing means and said delivery means adjacent the path of fabric movement therebetween for detecting construction distortions, and (f) drive means connected to said feeding means, said advancing means and said delivery means for driving all of the same at substantially equal lineal speeds to respectively feed the distorted fabric to said correction means, to advance the corrected fabric from said correction means and to deliver the fabric from the apparatus at the same speed so that elongation or stretching of the fabric during correction and detection of construction distortions is avoided since the tension in the fabric is not appreciably changed from the tension in the fabric prior to its passage to said feeding means to be fed to said correction means and pass said sensor means whereby the corrective action on the fabric can be accomplished under minimal tension and is substantially permanent.

8. Apparatus as claimed in claim 7 wherein said sensor means includes at least one sensor element supported for scanning movement adjacent the fabric and wherein said drive means further comprises sensor transmission means connecting said sensor element to said delivery means to drive said sensor element in scanning movement.

9. Apparatus as claimed in claim 7 wherein said feeding means comprises at least one feed roll, said advancing means comprises an advancing roll, said delivery means comprises at least one delivery roll, said correction means comprises a pair of bow-type correction rolls and a pair of skew-type correction rolls, said sensor means includes a pair of sensor elements supported for scanning movement adjacent the fabric path, and said drive means comprises rotative motive force means and transmission means connecting said motive force means to said feeding, advancing, and delivery rolls, to said correction rolls and to said sensor elements.

*10. Apparatus for correcting fabric distortions, said apparatus comprising:*

*(a) correction means defining a bow and skew correction zone and adapted to engage distorted fabric passing through the correction zone for correcting construction distortions therein,*

*(b) advancing means disposed on the output side of said correction means and immediately adjacent thereto and adapted to engage the corrected fabric for positively and continuously advancing the corrected fabric away from said correction means and for delineating the output side of the correction zone,*

*(c) delivery means disposed on the opposite side of said advancing means from said correction means and in spaced relation to said advancing means and adapted to receive the corrected fabric from the advancing means and to continuously deliver the fabric therefrom,*

*(d) sensor means positioned between said advancing means and said delivery means adjacent the path of fabric movement therebetween for detecting both bow and skew construction distortions while in relaxed state and associated with said correcting means, and*

*(f) drive means connected to said advancing means and said delivery means for continuously driving the same at lineal speeds sufficient to advance the corrected fabric past said sensor means under minimal tension whereby the corrective action on the fabric is substantially improved.*

References Cited

The following references, cited by the Examiner, are of record in the patented file of this patent or the original patent.

(References on following page)

UNITED STATES PATENTS

| | | | |
|---|---|---|---|
| 2,311,406 | 2/1943 | Mansfield et al. | 26—52 |
| 2,311,674 | 2/1943 | Lilja | 26—51.5 X |
| 2,795,029 | 6/1957 | Robertson et al. | 26—51.4 |
| 1,805,730 | 5/1931 | Weinheim | 26—51 X |
| 3,132,786 | 5/1964 | Davidson | 26—70 UX |
| 3,296,676 | 1/1967 | Macomson | 26—51.3 |
| 3,192,595 | 7/1965 | Morton et al. | 26—51.5 |
| 3,193,688 | 7/1965 | Morton et al. | 26—51.5 |

FOREIGN PATENTS

| | | | |
|---|---|---|---|
| 153,913 | 10/1963 | Russia | 26—51.5 |
| 886 | 1857 | Great Britain. | |
| 816,491 | 7/1959 | Great Britain | 26—51.4 |
| 993,507 | 5/1965 | Great Britain. | |

ROBERT R. MACKEY, Primary Examiner